United States Patent [19]

Warshawsky

[11] 4,449,170
[45] May 15, 1984

[54] LAMP SUPPORT

[76] Inventor: Jerome Warshawsky, 3284 Bertha Dr., Baldwin Harbor, N.Y. 11510

[21] Appl. No.: 434,547

[22] Filed: Oct. 15, 1982

[51] Int. Cl.³ ............................. F21S 1/12; F21S 3/12
[52] U.S. Cl. .................................. 362/413; 362/414; 362/419; 362/427; 362/431; 362/450
[58] Field of Search ................. 362/450, 86, 127, 130, 362/431, 419, 427, 432, 413, 414

[56] References Cited

U.S. PATENT DOCUMENTS

| Re. 19,655 | 7/1935 | Reimann et al. | 72/75 |
|---|---|---|---|
| 629,245 | 7/1899 | Frank | 72/75 |
| 1,832,492 | 11/1931 | Marchand | 362/801 |
| 2,574,211 | 11/1951 | Hill | 362/422 |
| 2,642,246 | 6/1953 | Stephans | 362/413 |
| 2,748,261 | 5/1956 | Wolar | 362/413 |
| 3,790,770 | 2/1974 | Stern | 362/801 |
| 4,300,186 | 11/1981 | Hurd | 362/450 |

*Primary Examiner*—Stephen J. Lechert, Jr.
*Assistant Examiner*—Howard J. Locker
*Attorney, Agent, or Firm*—Stephen E. Feldman

[57] ABSTRACT

A pharmacy type lamp having a light source disposed at one end of a tubular swing arm the other end of which extends into a vertically disposed support tube secured to a base pedestal. The tubular support is formed from welded seam tubular stock having extra weld material extending from the seam during the tubes formation to form a rib-like track within the support tube for coaction with stops coined from the material of the swing arm, at an extremity thereof disposed within the support tube to facilitate rotation of the swing arm within the support tube while limiting such rotation to almost 360°. A clutch, carried at one end of the support tube, centers the swing arm therewithin and facilitates gripping and release of the swing arm with respect to the support tube to restrict and permit movement (sliding and rotational) of the swing arm within the support tube. An end ring carried by the swing arm at the extremity thereof disposed within the support tube is notched to receive the rib-like track to further center and guide movement of the swing arm within the support tube.

6 Claims, 6 Drawing Figures

U.S. Patent May 15, 1984 4,449,170
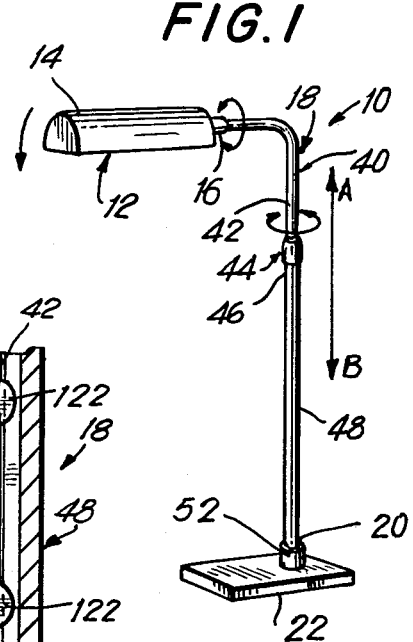
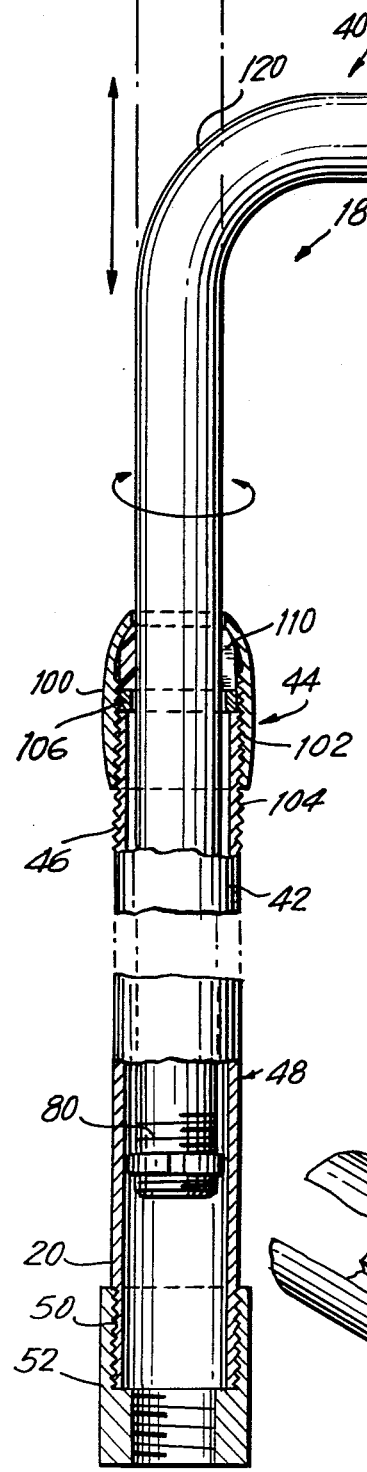
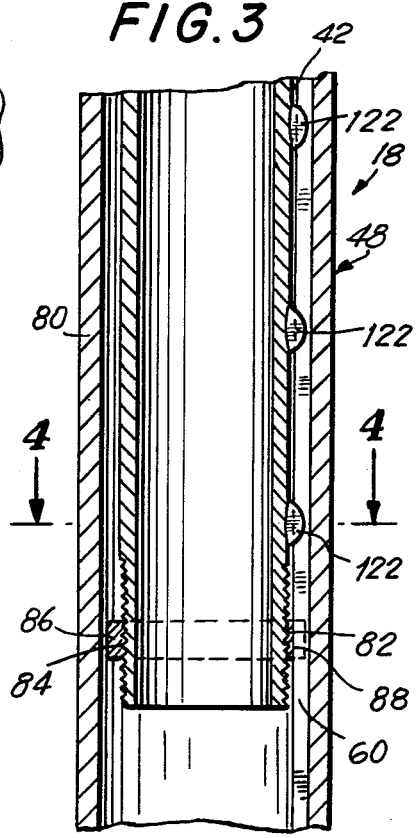
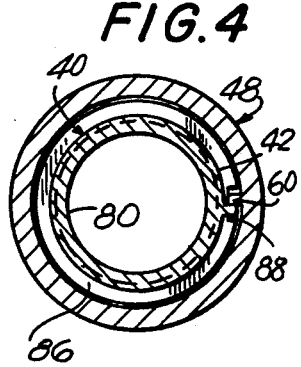
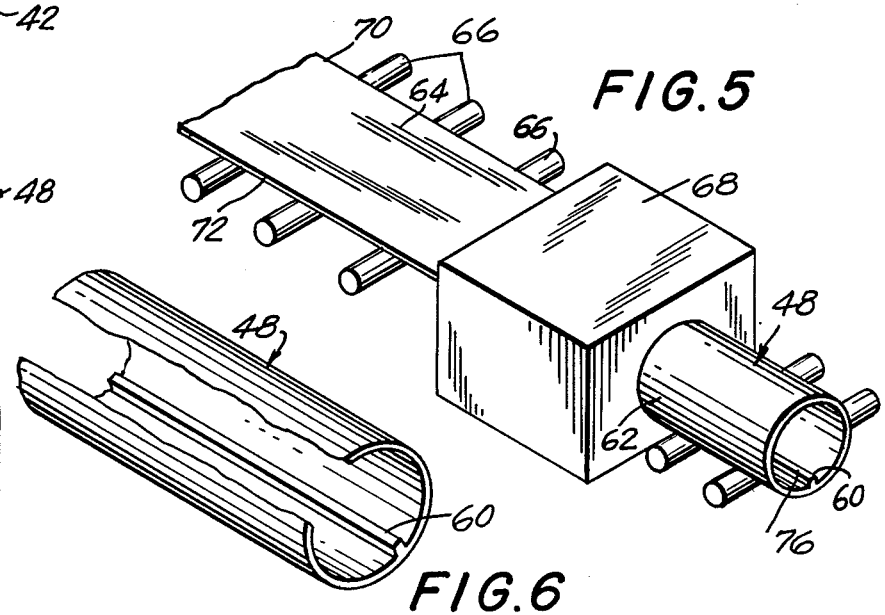

LAMP SUPPORT

BACKGROUND OF THE INVENTION—FIELD OF APPLICATION

This invention relates to lamp supports; and more particularly to lamp supports which facilitate rotation and height adjustment of the light source.

BACKGROUND OF THE INVENTION—DESCRIPTION OF THE PRIOR ART

The great majority of lamps provide a support (table, wall, or floor) which locates the light source in a relatively stationary position. If the light, from the light source, does not adequately light-up the object or area where light is required then one must either move the entire lamp or somehow get more light. More light is sometimes available in such a lamp if it is equipped with a three way bulb; but even that is not always adequate because the light source is still positionally fixed in location and height.

Some lamps provide more flexibility by mounting the light source on a swing arm which permits rotation of the light source about a vertical axis. Others also include clutch devices which facilitate raising and lowering the light source with respect to the vertical swing arm axis. These latter lamps are conventionally called pharmacy lamps. But, for such lamps where the swing arm rotates through 360°, and more, the electric wire, extending from the source of electricity to the light source, can become twisted. Continued twisting of the wire may unduly tighten same resulting in breakage of the wire, or disconnection of the wire ends from the place of connection to the light source. Either condition produces an undesirable and possibly dangerous situation since the broken or disconnected wire can create an electrical short circuit. The inconvenience of replacing a fuse blown by a short circuit, or re-setting a breaker thrown by a short circuit, is small compared to the danger of fire and electric shock which an electric short can produce. Lamps which permit rotation through 360° are also undesirable because they fail to carry approval by certification organizations such as the Underwriters Laboratories.

Some lamps include mechanisms which prevent rotation of the light source carrying arm through 360°. But, such rotation limiting mechanisms can be complex and may add to the cost of the lamp; or may fail with continued use and, by thereafter permitting rotation of the lamp through 360°, possibly create a dangerous short circuit condition.

Quite often the mechanism used to limit lamp rotation, to less than 360°, restricts the extent of available height adjustment; and by so affecting the lamps versatility makes the lamp undesirable to some prospective purchasers. Some of these lamps position the light source on an arm fabricated out of tubular material which is, in turn, rotationally and slidably mounted in a tubular support. The rotational stops for such lamps are sometimes struck from the metal of the tubular support, but this construction can mar the outside of the tubular support and create an aesthetically undesirable appearance. Other constructions avoid such an undesirable appearance by positioning the rotational stops longitudinally within the tubular support, but the procedures for doing so can be cumbersome and costly.

SUMMARY OF THE INVENTION

It is therefore an object of this invention to provide a new and improved lamp.

It is another object of this invention to provide a new and improved support for a lamp.

It is yet another object of this invention to provide a new and improved lamp support which facilitates rotational and vertical positioning of the lamp light source.

It is yet another object of this invention to provide a new and improved lamp support which facilitates rotational and vertical positioning of the lamp light source, while limiting such rotation to almost, but less than, 360°.

It is yet still another object of this invention to provide a new and improved lamp support which provides for selective vertical positioning of the lamp light source through a relatively large degree of vertical travel, while also facilitating selective rotational positioning of the light source through almost, but not more than, 360°.

It is yet still a further object of this invention to provide a new and improved support tube for a lamp.

It is yet still a further object of this invention to provide a new and improved rotational stop within the support tube for a lamp.

It is yet still a further object of this invention to provide a new and improved method of forming a support tube for a lamp.

It is yet still a further object of this invention to provide a new and improved method of forming a rotational stop within a support tube for a lamp.

This invention involves a swing arm and vertical support tube combination for a pharmacy type lamp, and contemplates: forming the support tube from sheet material formed and welded into tubular configuration and so that the weld material extends into and forms a rib like track within and throughout the length of the support tube; forming the swing arm and support tube to permit selective rotational positioning of the swing arm within the support tube while limiting such rotational positioning to almost, but less than, 360° by providing stops on the swing arm which cooperates with the track within the support tube; and forming the swing arm and support tube to permit selective vertical positioning of the swing arm within the support tube through a relatively large degree of vertical travel by providing a guide on the swing arm which cooperates with the track within the support tube.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWING

In the drawing:

FIG. 1 is a perspective view of a pharmacy type lamp incorporating the instant invention;

FIG. 2 is a perspective view of the support for the lamp of FIG. 1, cut away in part to better show the details thereof;

FIG. 3, is a vertical sectional view of a portion of the support of FIG. 2;

FIG. 4 is a transverse sectional view of the support of FIGS. 2 and 3 taken on line 4—4 of FIG. 3, but showing the entire cross-section of the support;

FIG. 5 is a perspective view of a schematic of the process for forming the support tube of the support of FIGS. 2-4; and FIG. 6 is a perspective view of a section of the support tube cut away to better show details of the ridge like track formed therewithin.

DESCRIPTION OF THE PREFERRED EMBODIMENT

For convenience, the invention will be described as applied to a pharmacy type lamp with a light source, housed within a cylinder type shade, and supported from a floor base by a support fabricated from metallic tubular elements; it being understood, nevertheless, that without departing from the scope of this invention; that the tubular elements may be formed from other suitable materials; that the lamp may house the light source in any one of a number of shades; and that the light source may be for mounting on a wall bracket or on a table, dresser or the like with its support of suitable and appropriate length.

With reference to FIG. 1, there is generally shown at 10 a pharmacy type lamp having a light source 12, housed within a cylindrical shade 14 disposed at an end 16 of a light source support 18 the other end 20 of which is secured to a pedestal or base 22. Suitable electrical conductor wire (not shown) extends from light source 12 through support 18 and base 22 to terminate in a male plug suitable for connecting the light source to a source of electricity. Light source 12 includes a conventional and appropriate socket (not shown) for receiving a light bulb, either incandescent or flourescent. An appropriate switch (not shown) is provided to turn the light bulb on and off when the light source is connected by way of the electrical conductor to an electrical outlet.

Light source support 18 included a swing arm 40 having a first end (corresponding to end 16 of support 18) which mounts an appropriate fitting for supporting the light bulb socket, and for rotationally supporting shade 14. A mid portion 42, of swing arm 40 extends through a clutch assembly 44, disposed at a first end 46 of a support tube 48, to be thereafter received within support tube 48. Swing arm 40 and support tube 48 constitute the major components of support 18. The other end of support tube 48 (which corresponds to end 20 of support 18) is threaded at 50 (FIG. 2) to receive an internally threaded fitting 52 (FIGS. 1 and 2) which serves to mount support 18, and light source 12 to base 22.

A rib or track 60 (FIGS. 3 and 4) extends within and throughout the entire length of support tube 48. It is formed therein when the tubular stock 62, (FIG. 5) from which appropriate lengths of support tube 48 are cut, is fabricated. Tubular stock 62 is fabricated in substantially conventional manner by substantially conventional equipment. A sheet 64 of metal, of suitable thickness and width, is fed by rollers 66 through a tube former 68 which forms sheet 64 into a tube with side edges 70, 72 of sheet 64 disposed adjacent each other. Appropriate and substantially conventional welding equipment (not shown), disposed within tube former 68, welds side edges 70, 72 of sheet 64 together to form tubular stock 62 with a welded seam appropriately finished on the outer surface of tubular stock 62 to provide same with a cylindrical and smooth outside surface. However, the welding equipment within tube former 68 is set to lay down extra weld material, as it welds side edges 70, 72 together, to form rib or track 60 so as to extend into and the entire length of tube stock 62. Support tubes 48 of appropriate length, depending upon whether the light is to be table, floor or wall mounted, are thereafter cut from tube stock 62.

An extreme end 80 (FIGS. 2-4) of swing arm 40 has external threads 82 (FIG. 3) formed thereon to receive internal threads 84 of an end ring 86. A notch 88 (FIG. 4) cut into end ring 86, is formed to receive track 60 and to be guided therealong as swing arm 40 is moved vertically up (in the direction of arrow A—FIG. 1) or down (in the direction of arrow B—FIG. 1). End ring 86 has an outside diameter which fits within the inside diameter of support tube 48 so as to be movable therewithin. As such, when end ring 86 is threaded onto swing arm 40 it maintains the end of swing arm 40 substantially centered within support tube 48 as swing arm 40 moves up and down therewithin.

The cooperation between mid-portion 42 of swing arm 40 and clutch 44 acts to further center swing arm 40 within support tube 48 as swing arm 40 is selectively moved up and down therewithin. Clutch 44 includes a fitting 100 (FIG. 2) the lower portion of which is formed with internal threads 102 that can be threaded onto external threads 104 formed at the upper end of support tube 48. A brass washer 106 and a plastic ring 108 with a split 110 extending its entire length are positioned within fitting 100 and on top of support tube 48. The upper portion of fitting 100 is curved inwardly both internally and externally so that as fitting 100 is threaded further onto the threaded end 104 of support tube 48, the internal surface of fitting 100 coacts with split ring 108 to close the ring around mid-portion 42 of swing arm 40 as it passes therethrough. The tighter fitting 100 is screwed down the tighter the pressure upon swing arm 40; and the looser fitting 100 is the looser will be the grip of split ring 108 on mid-portion 42 of swing arm 40.

The coaction of swing arm 40 and support tube 48 will thus permit swing arm 40 to be slid within support tube 48 from one extreme position where the two almost separate; to another extreme position where a curved portion 120 of swing arm 40 prevents further sliding of swing arm 40 down into support tube 48. The coaction of swing arm 40 within support tube 48 also permits rotation of swing arm 40 within support tube 48 about an axis of rotation passing therethrough. However, stops 122, coined from the material of swing arm 40 proximate extreme end 80 thereof and extending outwardly therefrom, will engage track 60 at an appropriate point in such rotation and prevent swing arm 40 from rotating through a full 360° circle. The permitted rotation of swing arm 40 within support tube 48 will be close to, but less than, 360°. As swing arm 40 is so rotated end ring 86, threaded onto threads 82 thereof, will be prevented from rotating due to the disposition of track 60 in notch 88 of ring 86 but threads 84 of swing arm 40 will turn within threads 82 of end ring 86 and end ring 86 will move a short distance up and down therewithin.

With lamp 10 assembled, as hereinabove described, it is quite simple to adjust height of light source 12 with respect to the respective height of a particular surface, or to relocate light source 12 around support tube 48. One need only loosen fitting 100 to relax the grip of split ring 108 upon mid-portion 42 of swing arm 40 and then slide swing arm 40 up or down, as desired, within support tube 48 until the desired height is reached. Fitting 100 is then tightened down until split ring 108 again grips swing arm 40 sufficiently to retain same in vertical position within support tube 48. It may, or may not, be necessary to loosen fitting 100 of clutch 44 prior to rotating swing arm 40 within support tube 48; however such rotation will only be permitted until stops 122 abut against track 60 within support tube 48.

From the above description it will thus be seen that there has been provided a novel and improved lamp support tube and method of fabricating same, as well as a novel and improved support for a pharmacy type lamp; which support tube, fabrication method, and lamp support are simple in construction and use and provide for an efficient and effective lamp that can be adjusted in height over a relatively large distance while also being able to be rotated through almost, but not more than, 360°.

It is understood that although I have shown the preferred form of my invention that various modifications may be made in the details thereof without departing from the spirit as comprehended by the following claims.

In addition, it thus will be seen that there is provided a lamp support which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

I claim:

1. A pharmacy type lamp; comprising:
   (a) a lamp base;
   (b) a lamp support carried by said lamp base;
   (c) a light source disposed proximately a predetermined end of said lamp support;
   (d) said lamp support including a first support member of predetermined tubular configuration, and a second support member also of predetermined tubular configuration and sized so that at least a portion of said second support member is received within said first support member so as to be able to be slid and rotated therewithin;
   (e) and at least one external stop member carried by said second support member for coaction with a rib-like track on and within said first support member, said rib-like track being part of said first support member and being formed within and extending a predetermined amount into said first support member but external to said second support member, to permit rotation of said second support member almost through 360°.

2. The lamp of claim 1 wherein said second support member is formed with a substantially ninety degree bend with respect to the disposition of said first support member and said light source is disposed so as to be at substantially ninety degrees with respect to said first support member.

3. The lamp of claim 2 wherein clutch means are carried by said first support member to receive and for coaction with said second support member to facilitate movement of one with respect to the other and to hinder such movement.

4. The lamp of claim 1 wherein said rib-like track extends continuously on and within said first support member from one extremity thereof to the other extremity thereof.

5. The lamp of claim 4 wherein said rib-like track is formed from material disposed within said first support member during the fabrication thereof.

6. The lamp of claim 5 wherein said first support member is fabricated by forming a sheet of metal into a tube and by welding edges of said sheet of metal together when forming the tube, and said rib-like track is formed by depositing weld material along the length of the tube where said edges meet and so as to extend into said tube.

* * * * *